Dec. 30, 1969  R. W. STOFFEL  3,486,792
CLAMPING DEVICE RESPONSIVE TO CHANGE IN SAFETY BELT MOTION
Filed Feb. 7, 1968  4 Sheets-Sheet 1
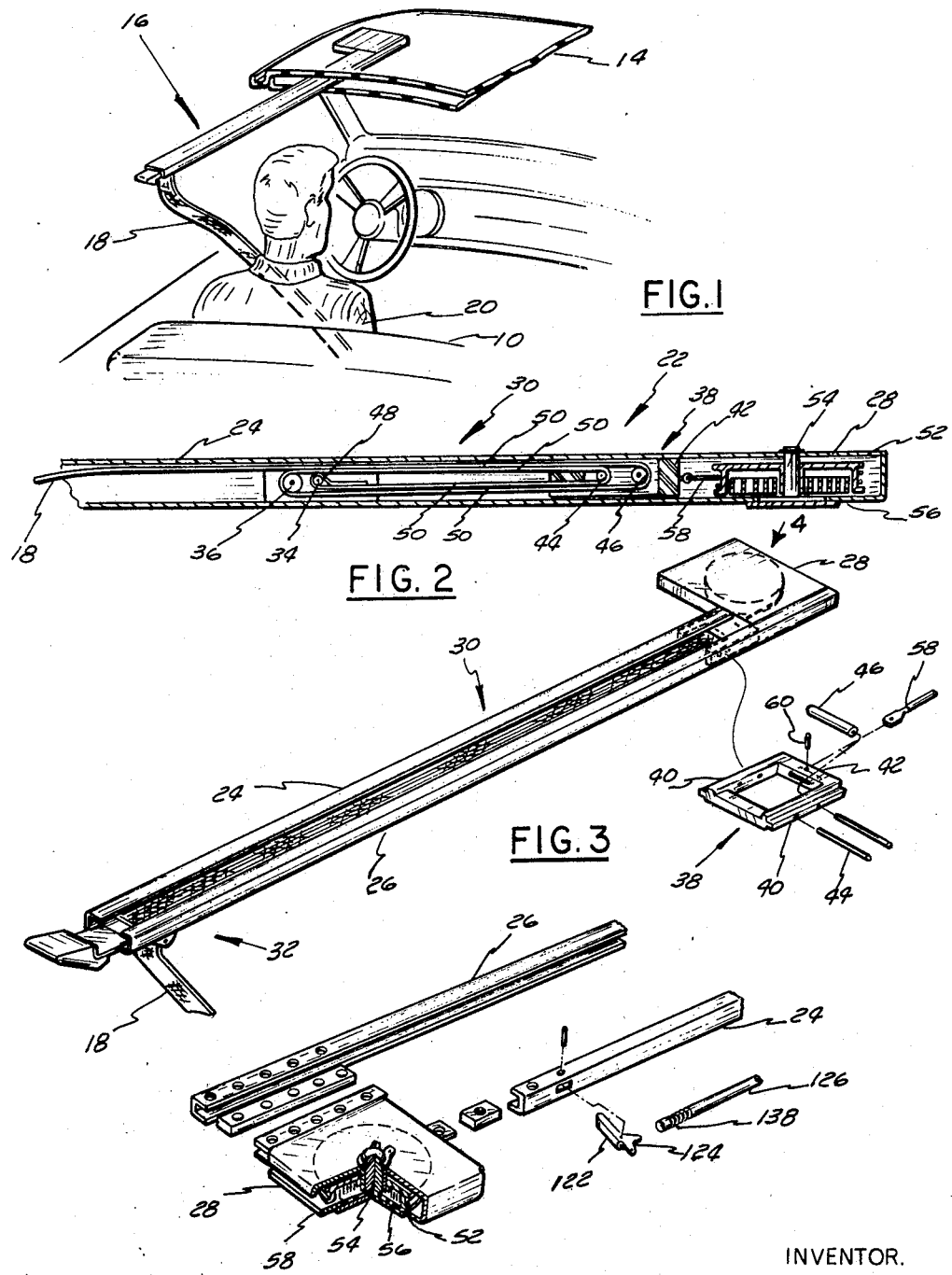
INVENTOR.
ROBERT W. STOFFEL
BY
ATTORNEYS.

Dec. 30, 1969   R. W. STOFFEL   3,486,792
CLAMPING DEVICE RESPONSIVE TO CHANGE IN SAFETY BELT MOTION
Filed Feb. 7, 1968   4 Sheets-Sheet 2

INVENTOR.
ROBERT W. STOFFEL
BY
ATTORNEYS

Dec. 30, 1969  R. W. STOFFEL  3,486,792
CLAMPING DEVICE RESPONSIVE TO CHANGE IN SAFETY BELT MOTION
Filed Feb. 7, 1968  4 Sheets-Sheet 3

INVENTOR.
ROBERT W. STOFFEL
BY
ATTORNEYS

INVENTOR.
ROBERT W. STOFFEL
BY
ATTORNEYS

United States Patent Office 3,486,792
Patented Dec. 30, 1969

3,486,792
CLAMPING DEVICE RESPONSIVE TO CHANGE
IN SAFETY BELT MOTION
Robert W. Stoffel, Ferndale, Mich., assignor to Jim
Robbins Seat Belt Co., Royal Oak, Mich.
Filed Feb. 7, 1968, Ser. No. 703,770
Int. Cl. A62b 35/00, 35/02; B60r 21/10
U.S. Cl. 297—388                    17 Claims

ABSTRACT OF THE DISCLOSURE

A linear retractor for a safety seat belt having a spring-loaded clamping device for anchoring the extended portion of the belt to the vehicle. The clamping device is actuated by a motion-sensing roller around which the belt is trained and a novel clutch which releases the clamping device to a belt-clamping position when the belt is slightly extended after a selected length of belt has been extended from the retractor and then partially retracted.

BACKGROUND OF THE INVENTION

Field of the invention

This invention relates to vehicle safety seat belt assemblies and more specifically to a belt retracting device having means permitting the user to extend a selected length of the belt from a stored position with clamping means arranged to clamp the extended length to the vehicle after the selected length has been partially retracted and then slightly extended.

Description of the prior art

One form of vehicle safety seat belt system comprises a pair of complementary lap belt sections and a shoulder belt section which are joined together by buckle means to form a closed restraining system. When unbuckled the belt sections are retracted into a stored position by a retracting device.

One type of retracting device requires the belt to be fully extended from its stored position when it is to form a part of the restraining system. Frequently the user finds that the belt is either too short or too long because of variations in the physical dimensions of the previous occupant of the seat. In addition, the lap belts are usually anchored to the vehicle structure so that movement of the seat assembly either forwardly or rearwardly has the effect of making the extended section of belt either too short or too long for a good fit. In either of the above instances, the belt length must be re-adjusted, adjustment being normally done at the buckle.

One approach to obviating the aforementioned problem in reel-type retractors has been to provide an automatic locking mechanism which permits the user to extend a selected length of belt and then upon release of the pull-out force as reflected in the rotation of the reel, the retractor reel is locked against further rotation in the unwind direction. Generally, automatic reel-locking retractors require a number of expensively fabricated, precision components in order to provide an effective and reliable device.

It is the broad purpose of the present invention to provide a retractor having a clamping means formed of a relatively few components actuated by the belt motion to anchor the extended portion of the belt to the vehicle independently of retractor operation.

SUMMARY

The preferred embodiment of the present invention is described with reference to a linear type belt retractor mounted on an overhead portion of the vehicle for biasing a shoulder belt towards a stored position. However, it is to be understood that the preferred retractor can be mounted in other vehicle locations such as the seat assembly to control a lap belt element.

The preferred retracting device allows the user to extend the belt from its stored position in the retractor, couple the belt to its companion half and then release the belt so that it partially retracts to provide a comfortable body fit. A further extension causes clamping means to anchor the extended belt to the vehicle.

The preferred device comprises an elongated housing adapted for attachment to the roof of the vehicle and having an opening for receiving the belt. The clamping device comprises a pair of spring-loaded clamping jaws which are mounted in the housing adjacent the opening. The belt moves between the jaws when it is extended from or retracted toward a stored position in the housing. The belt is folded around a pair of spaced roller means in the housing to form a series of parallel linear sections. One of the roller means is biased away from the second roller means so that upon release of the extended end of the belt the rollers elongate the stored linear belt sections to retract the belt into the housing.

The clamping jaws are movable in the direction of belt motion between a belt-release position and a belt-clamping position. A spring biases the jaws toward the belt-clamping position but a latch normally retains the jaws in the belt-release position so that the belt can be freely extended from the housing. The belt is wrapped around a motion-sensing roller mounted adjacent the jaws which rotates with belt movement. A clutch carried by the roller is adapted to displace a link connected to the latch after the belt has been partially retracted from an extended position and then slightly extended a second time. The link causes the latch to release the jaws which then engage the belt and anchor the extended portion of the belt to the housing.

A lever mounted on the retractor senses the stored belt within the housing and is adapted to disable the clutch so that the clamping jaws cannot be moved from the belt-release position when the belt is fully retracted.

It is therefore an object of the present invention to provide a seat belt device having means for anchoring the belt to the vehicle which are actuated by a change in direction of belt motion.

It is another object of the present invention to provide an improved means for actuating a spring-loaded seat belt clamping device which responds to the seat belt being slightly extended subsequent to a partial retraction of an extended portion of the belt.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 1 is a perspective view of an overhead retracting assembly embodying the present invention and connected to a shoulder belt forming part of a vehicle safety seat belt system;

FIGURE 2 is a longitudinal sectional view through the belt storage means of the preferred retracting assembly;

FIGURE 3 is a perspective view of the belt storage means with parts shown in exploded form;

FIGURE 4 is an enlarged perspective, partially exploded view of the wind-up drum in the retractor device;

DESCRIPTION OF THE PREFERRED EMBODIMENT

Figure 5:
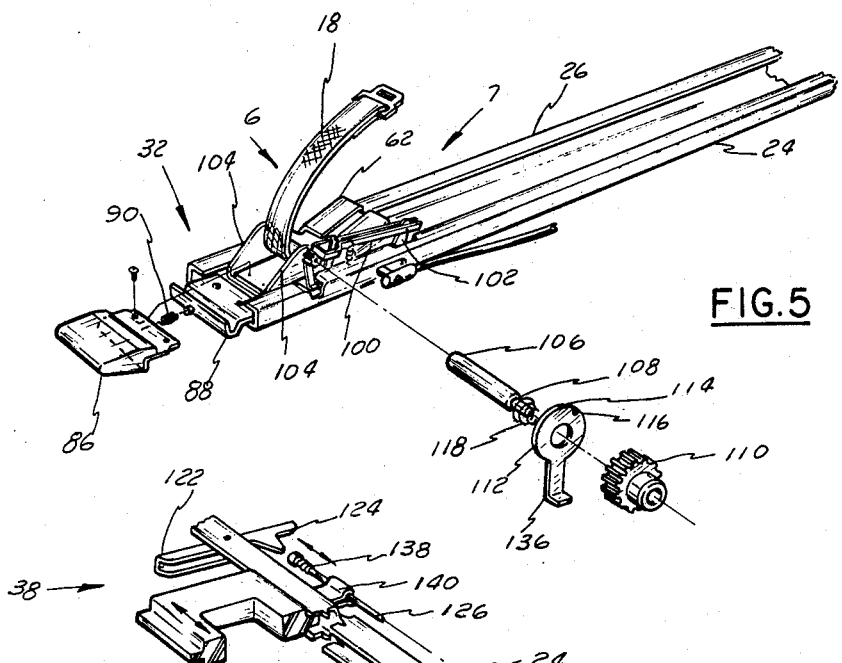
FIGURE 5 is an inverted perspective view of the clamping device, the latch means and the clutch means for releasing the clamping jaws, with parts shown in exploded relationship for purposes of description.

Now referring to the drawings, FIGURE 1 illustrates a seat assembly 10 mounted in a vehicle 14. The preferred retracting device 16 is attached to an overhead portion of the vehicle 14 and provides a connection between a shoulder belt 18 and the vehicle. The shoulder belt 18 is extended and coupled to complementary belt sections (not shown) to form a restraint system for a body 20 disposed in the seat assembly 10.

As can best be seen in FIGURES 2, 3 and 4, the retracting assembly 16 has an elongated housing 22 comprising a pair of spaced, parallel, opposed channel members 24 and 26. A belt wind-up assembly 30 is mounted in the housing 28 and a belt-clamping mechanism 32 is mounted between the channels 24 and 26 rearwardly of the wind-up assembly 30. As can best be seen in FIGURE 3, the belt 18 issues through an opening rearwardly of the belt-clamping mechanism 32.

Referring to FIGURE 2, the wind-up assembly 30 comprises an anchor pin 34 fixedly mounted between the channels 24 and 26. A roller 36 is mounted between the channels 24 and 26 adjacent the anchor pin 34. A truck 38 comprising a pair of spaced side arms 40 connected by a transverse section 42 is disposed in the housing with the side arms 40 slidably mounted in the channels 24 and 26. A pair of rollers 44 and 46 are rotatably mounted on the side arms 40 for rotation about axes which are parallel to the axis of the roller 36. The roller 44 has a lesser diameter than the roller 46.

The terminal end of the belt 18 is stitched into a loop 48 which is attached to the anchor pin 34. The belt extends from the anchor pin 34 and is wrapped successively around the rollers 44, 36 and 46, and then extends from the roller 46 toward the clamping means 32. Thus the belt is formed by the wind-up assembly 30 into a series of extensible, linear, generally parallel sections 50. The length of the belt sections 50 is proportional to the distance between the rollers 44 and 46, and the roller 36. Elongation of the linear sections 50 by movement of the truck 38 away from the roller 36 retracts the extended portion of the belt 18 into the housing 22. The application of a pull-out force on the extended end of the belt reduces the length of the sections 50 and moves the truck 38 toward the roller 36.

A wind-up drum 52 is journalled on a pin 54 which is supported at the forward end of the housing 28. A helical wind-up spring 56 having one end connected to the pin 54 and its opposite end attached to the drum 52 biases the drum in a wind-up direction. A cable 58 wrapped around the periphery of the drum 52 is attached to a pin 60 (FIGURE 3) carried on the transverse portion 42 of the truck 38. Thus it can be seen that the drum 52 biases the truck away from the anchor pin 34 so that a continual bias urges the belt toward its stored position within the housing. The spring 56 is yieldable to a nominal pull-out force on the extended end of the belt 18 so that the user can easily withdraw a selected quantity of the belt 18 from the housing 22.

Figure 8:
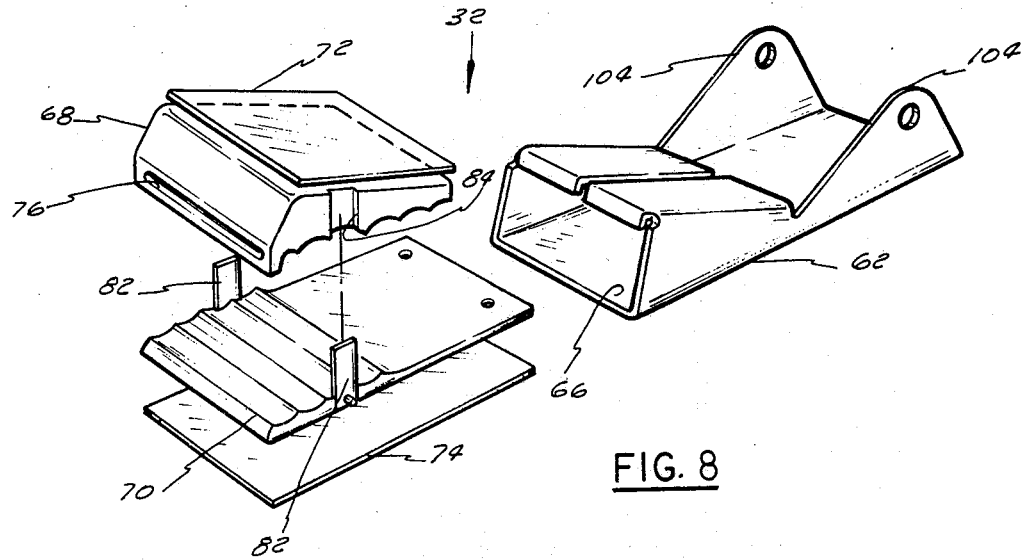
FIGURE 8 is an exploded view of the components of the clamping device.
Figure 9:
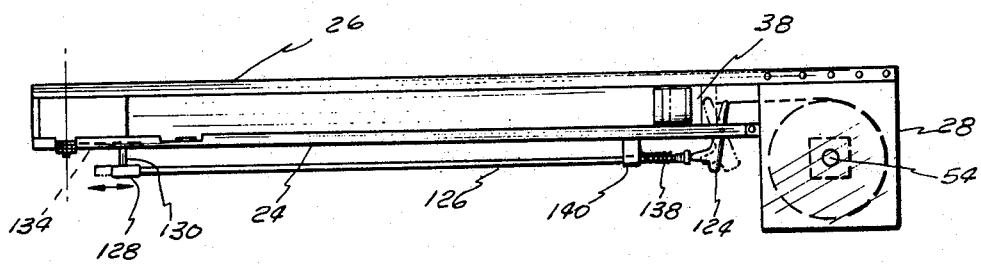
FIGURE 9 is a schematic view illustrating the clutch re-set mechanism in its alternate positions.
Figure 10:
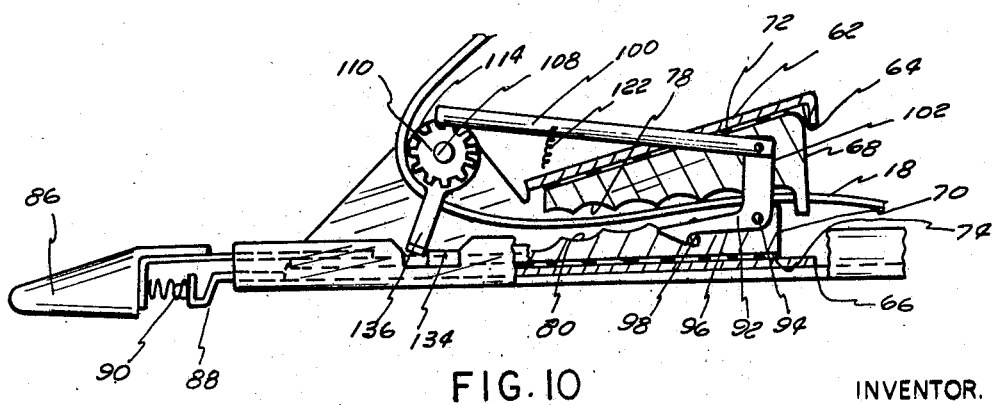
FIGURES 10-13 show the clutch, the latch mechanism and the clamping jaws in various operating positions during an operating cycle.

Now referring to FIGURES 8 and 10 for a detailed description of the clamping device 32, the clamping device comprises an open ended housing 62 having a pair of spaced bearing surfaces 64 and 66. The bearing surface 64 is inclined with respect to the bearing surface 66. A pair of cooperating clamping jaw members 68 and 70 are mounted in the housing 62. A sheet 72 of a low friction material, preferably Teflon, is disposed between the clamping jaw 68 and the bearing surface 64 and a similar sheet 74 of a low friction material is disposed between the companion jaw member 70 and the bearing surface 66. The jaw member 68 has an elongated aperture 76 which guides the belt 18 between a pair of confronting clamping surfaces 78 and 80 formed on the jaw members 68 and 70 respectively.

Still referring to FIGURE 10, when the jaw members 68 and 70 are moved in the direction of motion associated with the belt being extended from the retractor, the clamping surfaces 78 and 80 approach one another toward a belt clamping position. When the jaw members are moved in the opposite direction, the clamping surfaces 78 and 80 separate from one another and the belt.

A pair of side elements 82 carried by the clamping jaw 70 are slidably disposed in a pair of slots 84 (only one of which is shown) formed in the sides of the jaw 68. Thus the two clamping jaws 68 and 70 move as a unit between their belt-release and belt-clamping positions.

The jaw 70 extends through the narrow end of the housing 62 and has a downward bent portion 85 (FIGURE 10) and handle means 86 attached thereto for applying a release force on the jaw members. An extension 88 fixedly attached to the housing 62 provides means for seating a release spring 90 which acts against the handle means 86 to urge the locking jaws toward their belt-clamping position.

Figure 6:
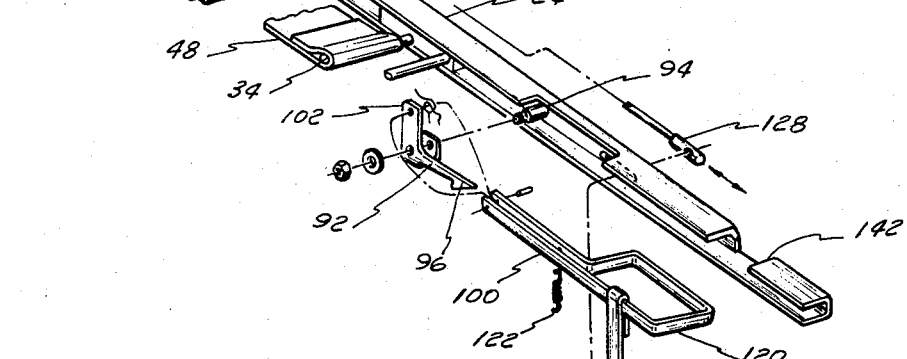
FIGURE 6 is an inverted and exploded view of the clutch re-set mechanism.

Referring to FIGURES 6 and 10, a bell crank 92 is pivotally mounted on the channel 24 by a pin 94. An arm 96 of the bell crank 92 is movable between upper and lower positions and is engageable with a pin 98 (FIGURE 10) carried by the jaw member 70 in its lower position. The arm 96 engages the pin 98 to retain the two jaws in their belt-release position until the bell crank 92 is pivoted to release the pin 98 so that the two jaws, under the influence of the spring 90, can snap toward their belt-clamping position.

An elongated locking link 100 is pivotally attached to the second arm 102 of the bell crank 92 and pivots the bell crank between its alternate positions. Thus it can be seen that the bell crank 92 functions essentially as a latch means for retaining the jaws 68 and 70 in their belt-release position with the link 100 acting as an actuating member for moving the bell crank 92 toward a release position.

Figure 7:
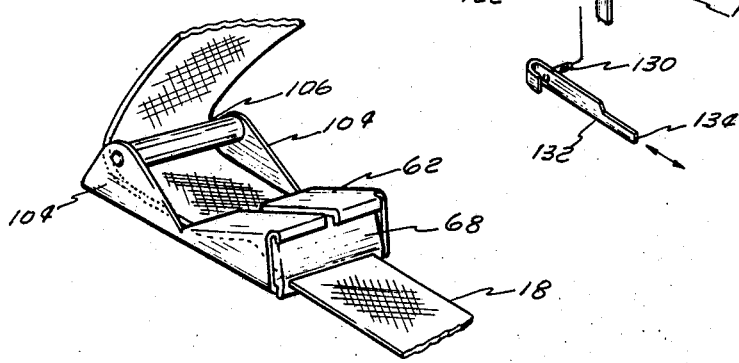
FIGURE 7 is a perspective view of the motion-sensing roller and clamping device separated from the retractor housing.

Referring to FIGURES 5, 7 and 8, the housing 62 has a pair of side sections 104 supporting a motion-sensing roller 106. The belt 18 is trained around the roller 106 so that the roller is rotated by belt movement. A shaft section 108 extends from the roller 106 and supports a gear 110 (FIGURE 5). The gear 110 is fixed to the shaft 108 so that the roller 106 and the gear 110 rotate together. A clutch plate 112 is rotatably mounted on the shaft section 108 adjacent gear 110. Clutch plate 112 has a circular interference portion 114 with a radial slot 116. A spring 118 mounted on the shaft section 108 acts between the roller 106 and the clutch plate 112 to bias the clutch plate against the gear 110.

Figure 12:
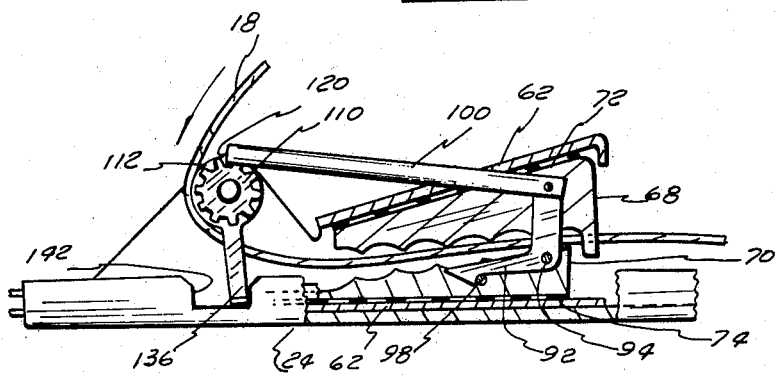

Referring to FIGURES 5 and 6, the locking link 100 has a bent secction 120 which normally rides on the interference portion 114 of the clutch plate 112. A spring 122 connects the locking link 100 and the channel 24 so that the locking link 100 is biased against the interference portion 114. This position is best illustrated in FIGURE 10. FIGURE 12 illustrates how counterclockwise rotation of the clutch plate 112 rotates the notch 116 to a position where the bent portion 120 of the locking link slips into the notch 116 and meshes with one of the teeth of the gear 110. In this position, subsequent clockwise rotation of the gear imparts linear motion to the locking link 100 toward the bell crank which is effective to pivot the bell crank 92 so that the arm 96 disengages the pin 98. The sidewalls of the notch 116 are cammed so that when the link 100 is in the notch 116 and engaged with the gear 110, counterclockwise rotation of the clutch plate 112 causes the link 100 to separate from the teeth of the gear 110 and ride up on the interference portion 114.

Now referring to FIGURES 4 and 6, a reset arm 122 is pivotally mounted on the channel 24 adjacent the fully retracted position of the truck 38. The inner end of the arm 122 senses the truck 38 in its fully retracted position. Movement of the inner end of the reset arm 122 pivots its outer end 124 in directions toward and away from the clutch plate 112. A spring loaded Bowden cable 126 has one end connected to the outer end 124 and an opposite end connected to a fastener 128 (FIGURE 6) which is connected by a pin 130 to a reset slide 132. The reset slide 132 is disposed in the channel 24 and moves with the Bowden cable 126.

The forward end 134 of the reset slide is adapted to engage a depending radially extending finger 136 (FIGURE 5) carried by the clutch plate 112. Thus when the truck 38 reaches its fully retracted position, the truck 38 pivots the reset arm 122 which in turn moves the Bowden cable 126, the fastener 128 and the slide 132 to a position where the forward end 134 of the slide engages the finger 136 of the clutch plate and rotates the clutch plate so that the slot 116 is separated from the locking link 100. When the belt is slightly extended from the housing and moves the truck 38 away from its fully retracted position, a spring 138, acting against a support 140 moves the Bowden cable 126 rearwardly which in turn pivots the reset arm 122 to its normal position in the path of motion of the truck.

Figure 11:
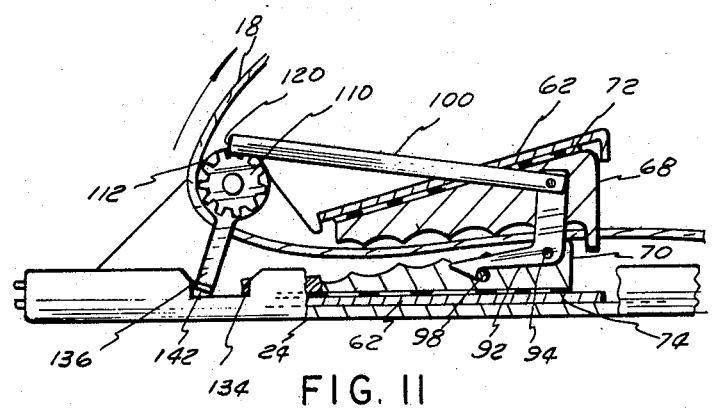
Figure 13:
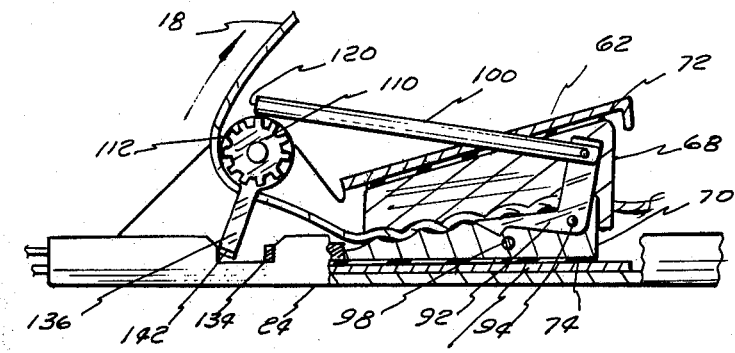

As can be seen in FIGURES 11, 12 and 13, when the reset slide 132 is moved by the Bowden cable 126 away from the finger 136 the clutch plate can rotate to its alternate position with the roller 106. Thus it can be seen that the reset arm 122 and its associated components provide means for uncoupling the gear 110 and the locking link 100 when a predetermined quantity of belt has been stored within the retractor, or until a predetermined quantity of belt has been extended from the retractor.

OPERATION OF THE PREFERRED EMBODIMENT

Now referring to FIGURES 10–13 for a description of the operation of the preferred retracting assembly, FIGURE 10 illustrates the reset slide 134 in its reset position retaining the coupling plate 112 against rotation. The clamping jaws 68 and 70 are retained in their belt-release position by the bell crank 92, but are spring biased toward the belt-clamping position by the spring 90. The locking link 100 is biased by the spring 122 against the intereference portion 114 of the coupling plate. In this position, the belt 18 is in its fully retracted condition and free from restraint so that the user can easily extend the belt.

Now referring to FIGURE 11, the belt 18 has been extended by a pull-out force from its fully retracted position in the direction of the arrow. The truck 38 has traveled away from its fully retracted position so that the reset slide 134 is separated from the finger 136 of the clutch plate. The roller 106 is rotated in the clockwise direction by the belt, however, the finger 136 is engaged by the end of a notch 142 in the channel so that it does not rotate. This permits the user to extend a sufficient belt length to couple the end of the belt to a complementary belt section (not shown). As long as the belt is being extended the clutch plate 112 maintains the position where the interference portion of the clutch plate prevents the locking link 100 from meshing with the gear 110.

Referring to FIGURE 12, after the user has buckled the end of the belt 18, the belt is partially retracted to form a snug fit around the user so that the roller 106 rotates in the counterclockwise direction in the direction of the arrow. The spring 108 acts between the roller 106 and the clutch plate 112 with a sufficient force so that the clutch plate 112 rotates in the counterclockwise direction until the finger 136 is rotated to the opposite side of the notch 142. In this alternate position the notch 116 of the clutch plate is positioned so that the end 120 of the locking link 100 can slip into the notch 116 and engage one of the teeth of the clutch gear 110. The clutch plate 136 and the locking link 100 are held in this position as long as the belt continues to be retracted.

Referring to FIGURE 13, and assuming the user has allowed the belt 18 to be retracted sufficicently to provide a desirable fit about his body, a slight extension of the belt in the direction of the arrow rotates the locking gear 110 in the clockwise direction which pushes the locking link 100 toward the bell crank 92 in a generally linear motion and with sufficient force to disengage the bell crank from the pin 98 so that the jaws 68 and 70 snap into their belt-clamping position. The belt 18 is then locked against motion in either direction. In this condition, the clamping means 32 anchor the extended portion of the belt 18 to the housing 22 which is in turn fixedly attached to the vehicle.

To release the belt 18, the user applies a release force on the handle 86 which moves the clamping jaws 68 and 70 from the belt-clamping position to their belt-release position where the pin 98 engages the bell crank 92. In this position, the bell crank retains the jaw members 68 and 70 against movement until they are again actuated by the locking link 100. When the belt 18 has been released from the clamping means 32, it retracts under the influence of the spring biased truck toward its stored position. As the truck assumes its fully retracted position, it moves the reset arm 122 which in turn moves the reset slide 132 to a position wherein it rotates the clutch plate to its alternate position with the locking link 100 uncoupled from the clutch gear 110.

It is to be understood that I have described an improved seat belt assembly which permits the belt to be extended by the user to any selected length with means which respond to a change in direction of belt movement for actuating clamping means and anchor the extended portion of the belt to the vehicle.

What is claimed is:
1. In a safety seat belt assembly adapted for mounting in a vehicle, the combination comprising:
   a safety seat belt;
   belt-clamping means adapted for mounting on said vehicle and having a normal belt release condition wherein said clamping means are disengaged from said belt, said clamping means being operable upon actuation, to assume a belt-clamping condition for providing a fixed connection between a portion of said belt and said vehicle;
   means for sensing the movement of said belt in first and second, opposite, directions and operable upon sensing said belt moving in said second direction subsequent to movement in said first direction to actuate said clamping means;
   said belt-clamping means comprising a housing fixedly mounted on said vehicle, said housing having a pair of planar bearing surfaces, one of said bearing surfaces being inclined with respect to the second of said bearing surfaces;
   a pair of cooperating jaw members having confronting clamping surfaces, said jaw members being mounted for co-acting motion between a belt release position and a belt-clamping position, one of said jaw members being engaged with one of said bearing surfaces and the second of said jaw members being engaged with the second of said bearing surfaces so that said clamping surfaces approach one another when said jaw members are moved toward said belt-clamping position from said belt-release position, and move away from one another when said jaw members are moved from said belt-clamping position and toward said belt-release position; and means guiding said belt between said confronting clamping surfaces.

2. The invention as defined in claim 1, including means for releasing said clamping means from said belt-clamping condition.

3. In a safety seat belt assembly adapted for mounting in a vehicle, the combination comprising:

a safety seat belt;

belt-clamping means adapted for mounting on said vehicle and having a normal belt release condition wherein said clamping means are disengaged from said belt, said clamping means being operable upon actuation, to assume a belt-clamping condition for providing a fixed connection between a portion of said belt and said vehicle;

means for sensing the movement of said belt in first and second, opposite, directions and operable upon sensing said belt moving in said second direction subsequent to movement in said first direction to actuate said clamping means;

said clamping means comprising a pair of cooperating clamping jaws mounted for movement between a pair of spaced positions, means guiding said belt between said clamping jaws, means biasing said clamping jaws toward a first of said pair of positions wherein said jaws engage said belt, latch means on said clamping means for retaining said jaws in the second of said pair of positions wherein said jaws are spaced from one another and disengaged from said belt;

said sensing means comprising a roller mounted on said vehicle, said belt being wrapped around a circumferential portion of said roller so that motion of said belt rotates said roller; clutch means mounted on said roller and operatively connected to said latch means so that rotation of said roller by said belt in said first direction subsequent to rotation of said roller in a reverse direction causes said latch means to release said jaws from the second of said pair of positions; said clutch means comprising a clutch gear fixedly mounted on said roller and rotatable therewith, said clutch gear having a continuous series of spaced peripheral teeth; a clutch plate mounted on said roller adjacent said clutch gear, said clutch plate having an interference edge adjacent said teeth and a notch in said interference edge, said clutch plate being rotatable relative to said clutch gear to index said notch between first and second positions; a displaceable locking link operatively connected to said latch means; and means biasing said link toward said clutch plate so that said link normally rides on the interference edge of said clutch plate and is disengaged from said clutch gear when said notch is in said second position, said link slipping into said notch to mesh with said teeth of said clutch gear when said notch is rotated into said first position by said roller rotating in said second direction so that a subsequent rotation of said roller in said first direction by said belt causes said clutch gear to displace said link and causes said latch means to release said jaw members.

4. The invention as defined in claim 3, wherein said latch means comprises a pivotably mounted bell crank having a pair of arms, one arm of said bell crank being attached to said locking link and the second arm of said bell crank being adapted to releasably engage one of said jaw members when said jaw members are in the second of said pair of positions.

5. In a safety seat belt assembly adapted for mounting in a vehicle, the combination comprising:

a safety seat belt;

retractor means adapted for mounting on said vehicle and connected to said belt at a point removed from one end thereof, said retractor means being adapted to retain an elongated section of said belt in a stored position and to bias said one end towards said stored position, said retractor means being yieldable to a pull-out force applied on said belt so that at least a portion of said belt can be extended from said stored position;

clamping means mounted on said vehicle, said clamping means having a belt clamping condition for providing a fixed connection to said vehicle between the extended end of said belt and said retractor means, and a normal belt release condition wherein the end of said belt can be extended from said retractor means;

means for actuating said clamping means from a belt release condition to a belt clamping condition in response to said belt being extended from said retractor subsequent to at least a portion of said belt being retracted into said retractor;

said retractor means comprising: an elongated housing having a belt receiving opening and adapted for mounting on said vehicle; first roller means fixedly mounted within said housing; a truck mounted for movement within said housing toward and away from said first roller means; second roller means carried by said truck; spring bias means urging said truck away from said first roller means; said belt being wrapped around said first and second roller means into a series of linear sections and extending through said belt receiving opening so that movement of the truck away from said first roller means increases the length of said linear sections to retract said belt through said belt receiving opening, and movement of said truck towards said first roller means permits said belt to be extended through said belt receiving opening;

means for sensing the position of said truck within said housing; and motor transmitting linkage connecting said sensing means and said actuating means for rendering said actuating means inoperative when a predetermined quantity of said belt has been retracted into said housing.

6. The invention as defined in claim 5, including means for disabling said clutch means when said belt has moved a predetermined distance in one of said predetermined directions.

7. The invention as defined in claim 5, including handle means on one of said jaw members for applying a manual release force to move said jaw members from the second of said pair of positions to the first of said pair of positions for engagement with said latch means.

8. In a safety seat belt assembly adapted for mounting in a vehicle, the combination comprising:

a safety seat belt;

retractor means adapted for mounting on said vehicle and connected to said belt at a point removed from one end thereof, said retractor means being adapted to retain an elongated section of said belt in a stored position and to bias said one end towards said stored position, said retractor means being yieldable to a pull-out force applied on said belt so that at least a portion of said belt can be extended from said stored position;

clamping means mounted on said vehicle, said clamping means having a belt clamping condition for providing a fixed connection to said vehicle between the extended end of said belt and said retractor means, and a normal belt release condition wherein the end of said belt can be extended from said retractor means;

means for actuating said clamping means from a belt release condition to a belt clamping condition in response to said belt being extended from said retractor subsequent to at least a portion of said belt being retracted into said retractor;

said last mentioned means comprising, bias means urging said clamping means toward the belt clamping condition from the belt release condition; latch means on said clamping means for retaining said clamping means in the belt release condition, said latch means being operable upon being actuated to release said clamping means from said belt release condition; and movement sensing means for sensing said belt being extended from said retractor means and being retracted toward said retractor means, said means being operable upon sensing said belt being retracted toward said retractor means subsequent to at least a portion of said belt being extended from said retractor means to actuate said latch means.

9. The invention as defined in claim 8, wherein said movement sensing means comprises a roller mounted on said retractor means, said belt being wrapped around a portion of a roller so that motion of said belt rotates said roller, and including clutch means mounted on said roller, and motion-transmitting linkage operatively connected with said latch means, said clutch means and said motion-transmitting linkage cooperating to release said latch means when said roller is rotated by the extension of said belt from said retractor means subsequent to a retraction of a portion of said belt toward said retractor.

10. The invention as defined in claim 9, including means for disabling said clutch means when a predetermined quantity of said belt has been retracted into said retractor means.

11. The assembly as defined in claim 15, and including means operable upon said belt being retracted to said stored position to reset said first means whereby said clamping means will not be actuated upon the next extension of said belt.

12. The invention as defined in claim 11, including handle means on one of said jaw members for applying a release force to move said jaw members from said belt-clamping position to said belt-release position for engagement with said latch means.

13. In a safety seat belt assembly adapted for mounting in a vehicle, the combination comprising:
a safety seat belt;
retractor means adapted for mounting on said vehicle and connected to said belt at a point removed from one end thereof, said retractor means being adapted to retain an elongated section of said belt in a stored position and to bias said one end towards said stored position, said retractor means being yieldable to a pull-out force applied on said belt so that at least a portion of said belt can be extended from said stored position;
clamping means mounted on said vehicle, said clamping means having a belt clamping condition for providing a fixed connection to said vehicle between the extended end of said belt and said retractor means, and a normal belt release condition wherein the end of said belt can be extended from said retractor means;
means for actuating said clamping means from a belt release condition to a belt clamping condition in response to said belt being extended from said retractor subsequent to at least a portion of said belt being retracted into said retractor;
said clamping means comprising; a housing fixedly mounted on said vehicle, said housing having a pair of planar bearing surfaces, one of said bearing surfaces being inclined with respect to the second of said bearing surfaces; a pair of cooperating jaw members having confronting clamping surfaces, said jaw members being mounted between said bearing surfaces for mounting between a belt release position and a belt clamping position, one of said jaw members being engaged with one of said bearing surfaces and the second of said jaw members being engaged with the second of said bearing surfaces so that said clamping surfaces approach one another when said jaw members move toward the belt clamping position from the belt release position and move away from one another when said jaw members are moved from said belt clamping position and towards said belt release position; and means guiding said belt between said confronting clamping surfaces.

14. In a safety seat belt assembly adapted for mounting in a vehicle, the combination comprising:
a safety seat belt;
belt clamping means adapted for mounting on said vehicle and having a normal belt release condition wherein said clamping means are disengaged from said belt, said clamping means being operable, upon actuation to assume a belt clamping condition for providing a fixed connection between a portion of said belt and said vehicle;
means for sensing the movement of said belt in first and second opposite directions and operable upon sensing said belt moving in said first direction, then said second direction and again in said first direction to actuate said clamping means;
said clamping means comprising a pair of cooperating clamping jaws mounted for movement between a pair of spaced positions, means guiding said belt between said clamping jaws, and means biasing said clamping jaws toward a first of said pair of positions wherein said jaws engage said belt;
latch means on said clamping means for retaining said jaws in the second of said pair of positions wherein said jaws are spaced from one another and disengaged from said belt;
said sensing means comprising a roller mounted on said vehicle, said belt being wrapped around a circumferential portion of said roller so that motion of said belt rotates said roller; and clutch means mounted on said roller and operatively connected to said latch means so that rotation of said roller by said belt in a first direction subsequent to rotation of said roller in a reverse direction causes said latch means to release said jaws from the second of said pair of positions.

15. In a safety seat belt assembly adapted for mounting in a vehicle, the combination comprising:
a safety seat belt;
retractor means adapted for mounting on said vehicle and connected to said belt at a point removed from one end of said belt, said retractor means being adapted to retain an elongated section of said belt in a stored position and to bias said one end towards said stored position, said retractor means being yieldable to a pull-out force applied on said belt so that at least a portion of said belt can be extended from said stored position;
clamping means mounted on said vehicle, said clamping means having a belt clamping condition for providing a fixed connection to said vehicle;
means normally retaining said clamping means in a belt release condition whereby said belt can be freely extended and retracted;
means for actuating said retaining means to move said clamping means to a belt clamping condition whereby said belt is locked to said vehicle, said actuating means comprising a first means operated in response to extension of said belt followed by retraction of said belt to a retracted position less than the stored position, and a second means actuated by said first means and by further extension of said belt whereby said belt clamping means is only actuated upon extension of said belt followed by less than complete retraction of said belt followed by further extension of said belt.

16. In an assembly as defined in claim 15, and including means for manually releasing said clamping means from said belt clamping condition.

17. In a safety seat belt assembly adapted for mounting in a vehicle, the combination comprising:
  a safety seat belt;
  belt clamping means adapted for mounting on said vehicle and having a normal belt release condition wherein said clamping means are disengaged from said belt, said clamping means being operable upon being actuated to assume a belt clamping condition for providing a fixed connection between a portion of said belt and said vehicle;
  means for actuating said clamping means comprising a first means operated in response to movement of said belt in a first direction followed by a movement of said belt in an opposite second direction and a second means actuated by said first means and by further movement of said belt in said first direction.

References Cited

UNITED STATES PATENTS

| | | | |
|---|---|---|---|
| 3,107,121 | 10/1963 | Mougey | 297—388 |
| 3,184,267 | 5/1965 | Rumble | 297—388 |
| 3,222,107 | 12/1965 | Ferrara | 297—388 |
| 3,292,744 | 12/1966 | Replogle | 297—388 X |
| 3,371,960 | 3/1968 | Bayer et al. | 297—386 |
| 3,400,977 | 9/1968 | Jones | 297—386 |

CASMIR A. NUNBERG, Primary Examiner

U.S. Cl. X.R.

242—107.2; 280—150; 297—389